2-FLUORO STEROIDS OF THE ANDROSTANE SERIES AND A PROCESS FOR THEIR PRODUCTION
John A. Hogg and Alan H. Nathan, Kalamazoo Township, Kalamazoo County, Mich., assignors to The Upjohn Company, Kalamazoo, Mich., a corporation of Delaware
No Drawing. Filed Jan. 16, 1959, Ser. No. 787,105
9 Claims. (Cl. 260—397.4)

This invention relates to certain novel 2-fluoro steroids of the androstane series and to a process for their production. These compounds and a process for their production can be represented by the following formulae:

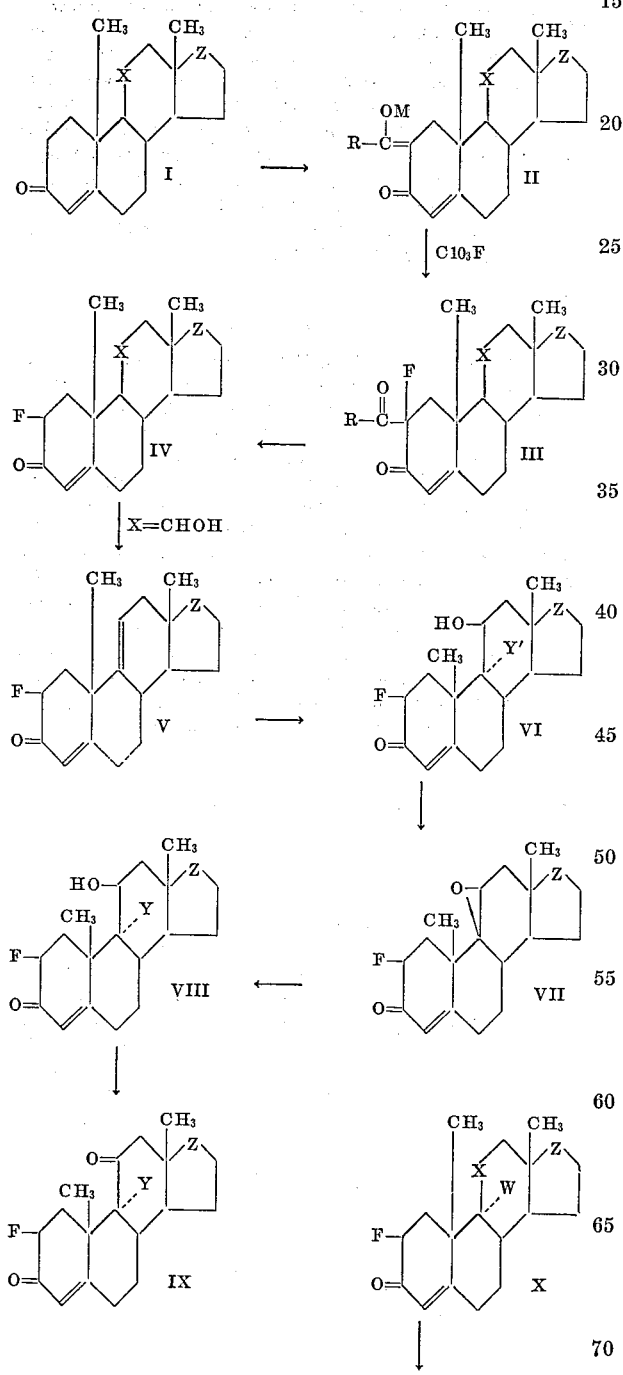

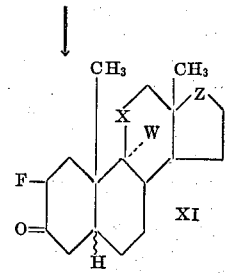

wherein X is methylene, hydroxymethylene or carbonyl; Y is hydrogen, chlorine or fluorine; Y′ is chlorine, bromine or iodine; Z is β-hydroxymethylene, β-hydroxy-α-methylmethylene, β - (lower-hydrocarbonacyloxy)-methylene or carbonyl; M is hydrogen or an alkali metal, e.g., sodium or potassium; R is hydrogen, carbolower-alkoxy or trifluoromethyl; and W is hydrogen and, when X is hydroxymethylene or carbonyl, chlorine or fluorine.

The compounds of this invention possess useful anabolic and androgenic activity with improved ratios of anabolic activity to androgenic activity, which renders the compounds particularly useful where androgenic activity is an undesirable side-effect when utilizing the anabolic properties. They are useful as livestock feed supplements and as gonadotropin inhibitors in pregnancy and menstrual disorders and are CNS regulators and cardiotonic agents. For administration to the animal organism orally or parenterally they can be incorporated in the usual pharmaceutical carriers, e.g., in the form of tablets, with or without enteric coating, pills, or capsules, with or without delayed response granules or pillules, aqueous or alcoholic suspensions or solutions, with or without the aid of solubilizers, ointments, jellies, creams, suppositories, bougies, etc.

In carrying out the process of this invention a testosterone compound represented by Formula I is condensed with a lower-alkyl formate, lower-alkyl oxalate or lower-alkyl trifluoroacetate in the presence of an alkali-metal base condensing agent according to the technique described in U.S. 2,767,198, 2,790,814 and our application Ser. No. 476,059, to produce a compound represented by Formula II wherein M is an alkali-metal. This compound, or the free enol thereof (M=H), is then reacted with perchloryl fluoride to produce a 2-fluoro compound represented by Formula III. The carbonyl containing radical attached to the $C_2$ carbon atom is then removed with an alkali-metal base and an alkanol, e.g., sodium methoxide in methanol to produce a 2-fluoro compound of this invention (IV). As starting compounds there can also be employed those compounds represented by Formula I except that the 11-substituent is a 9(11)-double bond or a 9β,11β-epoxy group, thus producing compounds represented by Formulae V and VII, respectively.

The 9-halo compounds of this invention (VI, VIII and IX) can be prepared from the 9(11)-dehydro compounds represented by Formula V, prepared as described above or by dehydrating the corresponding 11α-hydroxy or 11β-hydroxy compound, e.g., with N-bromoacetamide and anhydrous sulfur dioxide, toluene-sulfonic acid or with another known 11-hydroxy dehydrating agent, or by converting the 11α-hydroxy compound to a tosyl or other sulfonyloxy ester and dehydrating according to methods well known in the art. The thus-produced 9(11)-dehydro compound (V) is reacted with a peracid and aqueous N-bromo- or N-chloroamide or -imide to produce a 9α-halo-11β-hydroxy compound (VI). This compound is then reacted with a base, e.g., an alkali-metal acylate or alkali-metal hydroxide, to produce the corresponding 9β,11β-epoxy compound (VII). This compound is then reacted with anhydrous or aqueous hydrogen fluoride or hydrogen chloride, preferably the former, to produce the corresponding 9α-halo-11β-hydroxy compound (VIII) which can be oxidized, e.g., with sodium dichromate in acetic acid, chromium trioxide or N-bromo-acetamide, to produce the corresponding 11-keto compound (IX). Each of the compounds V, VII, VIII and IX where Z is β-(lower-hydrocarbon-acyloxy)-methylene can be hydrolyzed, e.g., with sodium bicarbonate or sodium hydroxide in aqueous methanol, to produce the corresponding compounds wherein Z is β-hydroxy-methylene.

The 4(5) dihydro compounds of this invention (XI) are produced by hydrogenating the corresponding $\Delta^4$ compounds, e.g., with hydrogen and palladium on charcoal catalyst. The 9α-halo compounds can also be prepared by hydrogenating an 11-hydroxy compound (IV, X=CHOH), a $\Delta^{9(11)}$ compound (V) or a 9β,11β-epoxy compound (VII) to produce the corresponding 4(5)-dihydro compound and then converting these compounds to the corresponding 9α-halo-11β-hydroxy and 9α-halo-11-keto compounds in the same manner as described hereinabove for the corresponding $\Delta^4$ compounds, i.e., the 11β-hydroxy compound is dehydrated to produce the corresponding $\Delta^{9(11)}$ compound which is then reacted with hypohalous acid, e.g., N-bromoacetamide, N-chlorosuccinimide or N-iodosuccinimide in the presence of perchloric acid, to produce the corresponding 9α-halo-11β-hydroxy compound. These compounds are then reacted with base, e.g., potassium acetate or sodium hydroxide, to produce the corresponding 9β,11β-epoxy compound. These epoxy compounds are reacted with aqueous or anhydrous hydrogen fluoride to produce the corresponding 9α-fluoro-11β-hydroxy compound or with hydrogen chloride to produce the corresponding 9α-chloro-11β-hydroxy compound. Each of the 9α-halo-11β-hydroxy compounds described above are oxidized, e.g., with chromic acid, to produce the corresponding 9α-halo-11-keto compounds.

The hydrogenation described above produces both the 5α- and 5β-4(5)-dihydro compounds which can be separated by fractional crystallization or chromatography according to procedures known in the art. The addition of acid to the hydrogenation mixture is productive of higher proportions of the 5α-isomer. Both of these isomers are physiologically active.

Fluorination with perchloryl chloride of the 2-alkoxy-oxalyl Compound II to form Compound III followed by removal of the alkoxyoxalyl compound to produce IV results in the introduction of the fluorine atom in the 2α-position. The 2-fluorine atom of all the 2-fluoro compounds of this invention has the alpha stereoconfiguration.

The following examples are illustrative of the process and products of this invention but are not to be construed as limiting.

EXAMPLE 1

*2-fluoro-17β-hydroxy-4-androsten-3-one*

To a solution of 5.76 g. of testosterone in 100 ml. of tertiary butyl alcohol at 65° C. was added 5.45 ml. of ethyl oxalate and 6.67 ml. of commercial 25% sodium methoxide in methanol. After stirring for one-half hour, the now deep green solution was cooled to 25–30° C. and 300 ml. of ether was added. The sodium enolate of 2-ethoxyoxalyl-17β-hydroxy-4-androsten-3-one which precipitated was filtered in a dry atmosphere and dried in a vacuum desiccator over calcium chloride for about 3 hours.

The dried sodium enolate was then dissolved in 170 ml. of methanol, the solution cooled to −10° C. and to it was then slowly added an ice-cold solution of 3.2 g. of perchloryl fluoride in 100 ml. of methanol. The solution was stirred for 15 minutes. The thus-produced 2-fluoro-2-ethoxyoxalyl-17β-hydroxy-4-androsten-3-one was decomposed by adding 7.0 ml. of 25% methanolic sodium methoxide to the solution. After one-half hour, ten drops of acetic acid was added, the solution filtered and the filtrate concentrated on a warm-water bath under reduced pressure to about a third of the original volume. The concentrate was diluted to about one liter with cold water and after about an hour the resulting precipitate was collected, washed with water, and dried in a vacuum desiccator. The 4.58 g. of 2-fluoro-17β-hydroxy-4-androsten-3-one thus obtained was purified by chromatography on a column of 200 g. of magnesium silicate which was eluted with hexanes plus 10% acetone. Two recrystallizations from acetone gave solvated 2-fluoro-17β-hydroxy-4-androsten-3-one melting at 161–162° C. after losing the solvent of crystallization at 110° C.

Calculated for $C_{19}H_{27}FO_2$: C, 74.47; H, 8.88; F, 6.2. Found: C, 74.54; H, 9.12; F, 6.3.

EXAMPLE 2

*2-fluoro-11β,17β-dihydroxy-17α-methyl-4-androsten-3-one*

Following the procedure of Example 1 exactly, but substituting 6.37 g. of 11β,17β-dihydroxy-17α-methyl-4-androsten-3-one as the starting steroid there was produced 2-fluoro-11β,17β-dihydroxy-17α-methyl-4-androsten-3 - one which was purified by chromatography on a 150 g. column of magnesium silicate which was eluted with hexanes plus 15% acetone and with acetone. The compound crystallized from a mixture of ethyl acetate and Skellysolve B (petroleum ether, B.P. 60–90°) as solvated crystals that lost their solvent at 105° in a vacuum, melted at 214.5–220° C. and had the analysis below.

Calculated for $C_{20}H_{29}FO_3$: C, 71.39; H, 8.69; F, 5.65. Found: C, 71.79; H, 8.51; F, 5.6.

EXAMPLE 3

*2-fluoro-11β,17β-dihydroxy-4-androsten-3-one*

Following the procedure of Example 1 exactly, but substituting an equivalent weight of 17β-hydroxy-17α-methyl-4-androsten-3-one as starting compound, there is thus produced 2-fluoro-11β,17β-dihydroxy-4-androsten-3-one.

Similarly, 11α,17β - dihydroxy-4-androsten - 3 - one, 11α,17β - dihydroxy-17α-methyl - 4 - androsten-3-one, 11β,17β - dihydroxy-17α-methyl-4-androsten-3-one, 17β-hydroxy - 4 - androstene-3,11-dione, 17β - hydroxy-17α-methyl-4-androsten-3-one and 17β-hydroxy-17α-methyl-4-androstene-3,11-dione are converted to 2-fluoro-11α,17β-dihydroxy - 4 - androsten-3-one, 2-fluoro-11α,17β-dihydroxy-17α - methyl-4-androsten-3-one, 2-fluoro-11β,17β-dihydroxy-17α - methyl-4-androsten-3-one, 2-fluoro-17β-hydroxy-4-androstene-3,11 - dione, 2-fluoro-17β-hydroxy-17α-methyl-4-androsten-3-one and 2-fluoro-17β-hydroxy-17α-methyl-4-androstene-3,11-dione, respectively.

EXAMPLE 4

*2-fluoro-17β-hydroxy-17α-methyl-4,9(11)-androstadien-3-one*

A solution of 6.0 g. of 17β-hydroxy - 17α - methyl-4,9(11)-androstadien-3-one in 100 ml. of tertiary butyl alcohol at 80° C. was cooled to 65° C. and to it was added, with stirring and under a nitrogen atmosphere, 5.45 ml. of ethyl oxalate followed immediately by 6.67 ml. of commercial methanolic sodium methoxide containing 25.7 g. of sodium methoxide per 100 ml. The mixture was stirred for 0.5 hour while permitting it to cool to about 25° C. 300 ml. of absolute ether was added and the mixture chilled briefly in an ice bath. The yellow precipitate was filtered while protecting the precipitate from moisture. The last traces of solvent were removed in a vacuum desiccator. The thus-produced sodium enolate of 2-ethoxyoxalyl-17β-hydroxy-17α - methyl-4,9(11)-androstadien-3-one was dissolved in 170 ml. of methanol and the resulting solution cooled to −10° C. in an ice salt bath. While maintaining the solution at between −10 and −5° C., a solution of 3.72 g. of perchloryl fluoride in 100 ml. of methanol was added over a period of about ten minutes. The solution was stirred for an additional 0.5 hour and the thus-produced solution of 2-fluoro - 2 - ethoxyoxalyl-17β-hydroxy-17α-methyl-4,9(11)-androstadien-3-one was mixed with 8.10 ml. of commercial sodium methoxide in methanol. After 0.5 hour, the solution was concentrated under reduced pressure to a small volume and then diluted with one liter of cold water. The resulting solid precipitate was collected, washed with water and dried. The 4.25 g. of thus-obtained 2-fluoro-17β-hydroxy-17α-methyl-4,9(11)-androstadien-3-one was purified by crystallization from ethyl acetate to give pure product melting at 182–183° C., having a $\lambda_{max.}$ of 240 mu, E=15,850, and the analysis below.

Calculated for $C_{20}H_{27}FO_2$: C, 75.44; H, 8.55; F, 5.97. Found: C, 75.27; H, 8.95; F, 5.96.

Similarly, 9β,11β-epoxy-17β-hydroxy - 17α - methyl-4-androsten-3-one and 17β-hydroxy-4,9(11)-androstadien-3-one are converted to 2-fluoro - 9β,11β - epoxy-17β-hydroxy - 17α - methyl-4-androsten-3-one and 2-fluoro-17β-hydroxy-4,9(11)-androstadien-3-one, respectively.

EXAMPLE 5

*2-fluoro-11β-hydroxy-4-androstene-3,17-dione*

A solution of 1.58 g. of 2-fluoro-11β,17β-dihydroxy-4-androsten-3-one in a mixture of 35 ml. of toluene and 15 ml. of cyclohexanone was heated until about 10 ml. were distilled to dry the solution. To the dry solution was added 1.5 g. of aluminum tertiary butoxide and the resulting solution was refluxed for 8 hours. A saturated aqueous solution of sodium potassium tartrate in excess of the amount theoretically required was added and the solvents then removed by steam distillation. The residue was extracted with methylene chloride which was then dried and poured over a chromatographic column of 150 g. of magnesium silicate. The column was developed with hexanes containing increasing proportions of acetone. There was thus eluted 2-fluoro-11β-hydroxy-4-androstene-3,17-dione.

Following the procedure of Example 5, but substituting 2-fluoro-17β-hydroxy-4-androstene-3,11-dione or 2-fluoro-11α,17β - dihydroxy-4-androsten-3-one as starting compound, there is thus produced 2-fluoro - 11α-hydroxy-4-androstene-3,17-dione and 2-fluoro-4-androstene-3,11,20-trione, respectively.

EXAMPLE 6

*2-fluoro-4-androstene-3,17-dione*

One gram of 2-fluoro-17β-hydroxy-4-androsten-3-one was oxidized at room temperature with a 20% excess over the theoretical amount required of chromium trioxide in 25 ml. of acetic acid containing 1 ml. of water for 1.5 hours. The reaction mixture was then poured into a large volume of water and extracted thoroughly with methylene chloride. The methylene chloride solution was separated, washed with aqueous sodium bicarbonate, water and then dried. The dried solution was chromatographed on a 40 g. column of magnesium silicate. The column was developed with hexanes containing increasing proportions of acetone. There was thus eluted substantially pure 2-fluoro-4-androstene-3,17-dione.

Following the procedure of Example 6, but substituting as starting steroid 2-fluoro-17β-hydroxy - 4 - androstene-3,11-dione, 2-fluoro-11β,17β-dihydroxy - 17α - methyl-4-androsten-3-one or 2-fluoro-17β - hydroxy - 4,9(11)-androstadien-3-one there is thus produced 2-fluoro-4-androstene-3,11,17-trione, 2-fluoro-17β - hydroxy-17α-methyl-4-androsten - 3,11 - dione and 2-fluoro - 4,9(11)-androstadiene-3,17-dione, respectively.

EXAMPLE 7

*2-fluoro-17β-hydroxy-4-androsten-3-one 17-propionate*

A mixture of 0.3 g. of 2-fluoro-17β-hydroxy-4-androsten-3-one, 2 ml. of dry pyridine, and 2 ml. of propionic anhydride was maintained at a temperature of about 26° C. for 22 hours. The mixture was then poured into 25 ml. of water and stirred for 2 hours at about 26° C. The precipitated 2-fluoro-17β-hydroxy-4-androsten-3-one 17-propionate was separated by filtration, washed with water and dried.

Similarly, 2-fluoro-17β-hydroxy-4-androstadien-3-one is converted to other 2-fluoro-17β-hydroxy-4-androstadien-3-one 17-acylates by esterification of the 17β-hydroxy group, e.g., by reaction with the appropriate acid anhydride, acid chloride or bromide, ester by ester exchange, acid in the presence of an esterification catalyst, etc., wherein the acyl group is the acyl radical of, for example, a lower-aliphatic acid, e.g., formic, acetic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts) e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other heterosubstituted acids, e.g., ethylmercaptoacetic, benzylmercaptoacetic, etc.

Following the procedure of Example 7, but substituting as starting compound 2-fluoro-11β, 17β-dihydroxy-4-androsten - 3 - one, 2 - fluoro - 17β - hydroxy - 4,9(11)-androstadien-3-one or 2-fluoro-17β-hydroxy-4-androstene-3,11-dione, there is thus produced 2-fluoro-11β, 17β-dihydroxy-4-androsten-3-one 17-propionate, 2-fluoro-17β-hydroxy-4,9(11)-androstadien-3-one 17-propionate and 2-fluoro - 17β - hydroxy - 4-androstene-3,11-dione 17-propionate, respectively. Following the procedures of the paragraph following Example 7, other 17-esters of these compounds, e.g., those named in that paragraph, are produced. Substituting 2-fluoro-11α,17β-dihydroxy-4-androsten-3-one as the starting compound produces 2-fluoro-11α, 17β-dihydroxy-4-androsten-3-one 11, 17-dipropionate and the esters named in the paragraph following Example 7. These diesters can be selectively hydrolyzed under mildly alkaline conditions to produce the corresponding 17-mono-esters.

EXAMPLE 8

*2-fluoro-17β-hydroxy-4,9(11)-androstadien-3-one 17-propionate*

To a solution of 10 g. of 2-fluoro-11β, 17β-dihydroxy-4-androsten-3-one 17-propionate dissolved in 100 ml. of dry pyridine at 25° C. was added 6.7 g. of N-bromoacetamide and the mixture stirred for 5 minutes at 25° C. in a nitrogen atmosphere. The mixture was cooled to 12° C. and anhydrous sulfur dioxide was added until a negative test was obtained with acidified potassium iodide-starch paper. 200 ml. of deionized water was added dropwise, the temperature of the resulting mixture being maintained at below 30° C. during the addition. The stirred mixture was maintained at 12° C. for one-half hour and then at 0–5° C. for 18 hours. The precipitated steroid was filtered, washed with water and the filter cake dried to give 2-fluoro - 17β-hydroxy-4,9(11)-androstadien-3-one 17-propionate.

Similarly, other 17-esters of 2-fluoro-11β, 17β-dihydroxy-4-androsten-3-one, e.g., wherein the acyl radical of the 17-ester group is that of an acid named in the paragraph following Example 7, are dehydrated according to the method of Example 8 to produce the corresponding esters of 2-fluoro-17β-hydroxy-4,9(11)-androstadien-3-one.

Following the procedure of Example 8 but substituting 2 - fluoro - 11α,17α-dihydroxy-4-androsten-3-one 17-propionate as the starting steroid, there is also produced 2-fluoro-17α-hydroxy-4,9(11)-androstadien-3-one. Similarly, 2-fluoro-11β-hydroxy-4-androstene-3,11-dione is converted to 2-fluoro-4,9(11)-androstadiene-3,11-dione.

EXAMPLE 9

*2-fluoro-17β-hydroxy-17α-methyl-4,9(11)-androstadien-3-one*

Following the procedure of Example 8 exactly, but substituting an equivalent amount of 2-fluoro-11β, 17β-dihydroxy-17α-methyl-4-androsten-3-one as the starting steroid, there is thus produced 2-fluoro-17β-hydroxy-17α-methyl-4,9(11)-androstadien-3-one. The dried filter cake is then dissolved in methylene chloride and chromatographed over a column of magnesium silicate. The column is developed with hexanes containing increasing proportions of acetone. There is thus eluted substantially pure 2-fluoro - 17β-hydroxy-17α-methyl-4,9(11)-androstadien-3-one.

EXAMPLE 10

*2-fluoro-9α-bromo-11β, 17β-dihydroxy-17α-methyl-4-androsten-3-one*

To a solution of 2 g. of 2-fluoro-17β-hydroxy-17α-methyl-4,9(11)-androstadien-3-one in 100 ml. of acetone was added dropwise, with stirring at 15° C., 2 g. of N-bromoacetamide dissolved in 25 ml. of water. A solution of 10 ml. of 0.8 N perchloric acid was then slowly added followed, at 5-minute intervals, by two more 10-ml. portions at the same temperature. After 20 minutes, there was added a sufficient amount of a saturated aqueous solution of sodium sulfite to discharge the yellow color of the solution. The resulting mixture was then diluted with 100 ml. of water thereby precipitating the 2-fluoro-9α-bromo-11β, 17β-dihydroxy-17α-methyl-4-androsten-3-one which was separated by filtration and dried.

Following the procedure of Example 10, but substituting 2-fluoro-17β-hydroxy-4,9(11)-androstadien-3-one 17-propionate or 2-fluoro-4,9(11)-androstadiene-3,17-dione as the starting compound, there is thus produced 2-fluoro-9α-bromo-11β, 17β-dihydroxy-4-androsten-3-one 17-propionate and 2-fluoro-9α-bromo-11β-hydroxy-4-androstene-3,17-dione, respectively. Other 17-esters of 2-fluoro-17β-4,9(11)-androstadien-3-one, e.g., wherein the acyl radical of the ester group is that of an acid named in the paragraph following Example 7, are similarly converted to the corresponding 17-esters of 2-fluoro-9α-bromo-11β, 17β-dihydroxy-4-androsten-3-one.

EXAMPLE 11

*2-fluoro-9α-chloro-11β, 17β-dihydroxy-17α-methyl-4-androsten-3-one*

Following the procedure of Example 10 exactly, but substituting an equimolar amount of N-chlorosuccinimide for the N-bromoacetamide, there was thus produced 2-fluoro-9α-chloro-11β,17β-dihydroxy-17α-methyl - 4 - androsten-3-one.

Similarly, 2-fluoro-17β-hydroxy-4,9(11) - androstadien-3-one 17-propionate and 2-fluoro-4,9(11)-androstadiene-3,17-dione are converted to 2-fluoro-9α-chloro-11β,17β-dihydroxy-4-androsten-3-one and 2-fluoro-9α-chloro-11β-hydroxy-4-androstene-3,17-dione, respectively. The corresponding 9α-iodo compounds of each of the above compounds are prepared by substituting N-iodosuccinimide for the N-chlorosuccinimide.

EXAMPLE 12

*2-fluoro-9β,11β-epoxy-17β-hydroxy-17α-methyl-4-androsten-3-one*

A stirred mixture of 2.5 g. of 2-fluoro-9α-bromo-11β,17β-dihydroxy-17α-methyl-4-androsten-3-one and 50 ml. of methanol was titrated with 0.2 N aqueous sodium hydroxide until the mixture remained pink to phenolphthalein after stirring for one hour. The mixture was then concentrated at reduced pressure and extracted with ether. The ether extract was washed with water, dried over anhydrous sodium sulfate and then the solvent distilled to give a residue of 2-fluoro-9β,11β-epoxy-17β-hydroxy-17α-methyl-4-androsten-3-one.

Following the procedure of Example 12, but substituting 2-fluoro-9α-bromo-11β,17β-dihydroxy-4 - androsten-3-one 17-propionate or 2-fluoro-9α-bromo-11β-hydroxy-4-androstene-3,17-dione as starting compound, there is thus produced 2-fluoro-9β,11β-epoxy-17β-hydroxy-4-androsten-3-one 17-propionate and 2-fluoro-9β,11β - epoxy-4-androstene-3,17-dione, respectively. Other 17-esters of 2-fluoro-9α - bromo-11β-hydroxy-4-androsten-3-one, e.g., wherein the acyl radical of the ester group is that of an acid named in the paragraph following Example 7, are similarly converted to the corresponding 17-esters of 2-fluoro-9β,11β-epoxy-17β-hydroxy-4-androsten-3-one.

EXAMPLE 13

*2,9α-difluoro-11β,17β-dihyroxy-17α-methyl-4-androsten-3-one*

A solution of 2 g. of 2-fluoro-9β,11β-epoxy-17β-hydroxy-17α-methyl-4-androsten-3-one in 18 ml. of methylene chloride was cooled to −60° C. and to the cooled solution was added a mixture of 3.57 g. of anhydrous hydrogen fluoride, 4 ml. of methylene chloride and 6.8 g. of tetrahydrofuran, also precooled to −60° C. The mixture was maintained at about 0° C. for 3 hours and then poured with stirring into a mixture of 30 g. of sodium carbonate, 120 ml. of water and 90 g. of ice. After 5 minutes the mixture was refrigerated for one hour and the precipitated product separated by filtration, washed with water and dried. The dried product was dissolved in methylene chloride and chromatographed on a column of 80 g. of magnesium silicate. The column was developed with hexanes containing increasing proportions of acetone to elute 2,9α-difluoro-11β,17β-dihydroxy-17α-methyl-4-androsten-3-one, a light crystalline solid.

Following the procedure of Example 13, but substituting 2-fluoro-9β,11β-epoxy-17β-hydroxy - 4 - androsten-3-one 17-propionate or 2-fluoro-9β,11β-epoxy-4-androstene-3,17-dione as starting compound, there is thus produced 2,9α-difluoro-11β,17β-dihydroxy-4-androsten - 3 - one 17-propionate and 2,9α-difluoro-11β-hydroxy-4 - androstene-3,17 - dione, respectively. Other 17 - esters of 2-fluoro-9β,11β-epoxy-17β-hydroxy-4-androsten-3-one, e.g., wherein the acyl radical of the ester group is that of an acid named in the paragraph following Example 7, are similarly converted to the corresponding 17-esters of 2,9α-difluoro-11β,17β-dihydroxy-4-androsten-3-one.

Alternatively, instead of the anhydrous hydrogen fluoride employed in Example 13, there can be substituted an equivalent amount of 48% aqueous hydrogen fluoride and the reaction run for 5 hours at room temperature.

EXAMPLE 14

*2,9α-difluoro-17β-hydroxy-17α-methyl-4-androstene-3,11-dione*

To a solution of 0.5 g. of 2,9α-difluoro-11β,17β-dihydroxy-17α-methyl-4-androsten-3-one in 20 ml. of glacial acetic acid was added a solution of 0.25 g. of chromium trioxide and 1 ml. of water in 20 ml. of acetic acid. The mixture was maintained at room temperature for 4.5 hours and then mixed with 5 ml. of methanol. The solvent was removed by distillation at reduced pressure and the almost dry residue was mixed with 20 ml. of water. The precipitate was filtered, washed with water and then dried to give 2,9α-difluoro-17β-hydroxy-17α - methyl-4-androstene - 3,11 - dione which was purified by crystallization from a mixture of hexanes and acetone.

Following the procedure of Example 14, but substituting 2,9α-difluoro-11β,17β-dihydroxy-4-androsten-3-one 17- propionate, or 2,9α-difluoro-11β-hydroxy-4-androstene-3,17-dione as starting compound, there is thus produced 2,9α-difluoro-17β-hydroxy-17α-methyl-4-androstene-3,11-dione 17-propionate and 2,9α-difluoro-4-androstene-3,11,17-trione, respectively. The 9α-chloro, 9α-bromo and 9α-iodo compounds corresponding to each of the above starting 9α-fluoro-11β-hydroxy compounds are similarly oxidized to the corresponding 11-keto compounds.

EXAMPLE 15

2,9α-difluoro-11β,17β-hydroxy-4-androsten-3-one

A solution of 0.5 g. of 2,9α-difluoro-11β,17β-hydroxy-4-androsten-3-one 17-propionate and 80 mg. of potassium hydroxide in 10 ml. of ethanol and 1 ml. of water was heated on a water bath for one hour. The mixture was then poured into 50 ml. of water and neutralized with dilute hydrochloric acid. The mixture was extracted with three successive 50-ml. portions of methylene chloride which was then washed repeatedly with water, dried and chromatographed over a 20-g. column of magnesium silicate. The column was developed with hexanes containing increasing proportions of acetone. There was thus eluted substantially pure 2,9α-difluoro-11β,17β-hydroxy-4-androsten-3-one.

Following the procedure of Example 15, but substituting 2-fluoro-17β-hydroxy-4-androsten-3-one 17-propionate, 2-fluoro-11β,17β-dihydroxy-4-androsten-3-one 17-propionate, 2-fluoro-17β-hydroxy-4-androstene-3,11-dione 17-propionate or 2,9α-difluoro-17β-hydroxy-4-androstene-3,11-dione 17-propionate as the starting compound, there is thus produced 2-fluoro-17β-hydroxy-4-androsten-3-one, 2-fluoro-11β,17β-dihydroxy-4-androsten-3-one, 2-fluoro-17β-hydroxy-4-androstene-3,11-dione and 2,9α-difluoro-17β-hydroxy-4-androstene-3,11-dione, respectively. The 9α-chloro, 9α-bromo and 9α-iodo compounds corresponding to the above 9α-fluoro starting compounds are also hydrolyzed to the corresponding 17-hydroxy compounds.

EXAMPLE 16

2-fluoro-17β-hydroxy-5α-androstan-3-one

A solution of 5.0 g. of 2-fluoro-17β-hydroxy-4-androsten-3-one in 190 ml. of 95% ethanol containing 0.5 ml. of 5% palladium on charcoal catalyst and 0.5 ml. of concentrated hydrochloric acid was shaken in an atmosphere of hydrogen at 2 atmospheres pressure. The theoretical amount of hydrogen was absorbed within a few minutes. After removing the catalyst by filtration through a bed of diatomaceous earth, the clear, colorless solution was evaporated to dryness on a warm water bath at reduced pressure. The residue was dissolved in methylene chloride and passed over a column of 200 g. of magnesium silicate (Florisil). The column was eluted with 400-ml. fractions; the first eight consisting of hexanes (Skellysolve B) plus 5% acetone and the next eight consisting of hexanes plus 8% acetone. Fractions 10 to 15 contained 2.26 g. of crystalline product which was crystallized twice from a mixture of ethyl acetate and hexanes and once from ethyl acetate to give 2-fluoro-17β-hydroxy-5α-androstan-3-one melting at 201–205.5° C. A further recrystallization raised the melting point to 203–205.5° C. and gave product having the analysis below.

Calculated for $C_{19}H_{29}FO_2$: C, 73.99; H, 9.48; F, 6.61. Found: C, 73.86; H, 9.66; F, 6.24.

EXAMPLE 17

2-fluoro-17β-hydroxy-5β-androstan-3-one

Following the procedure of Example 16 exactly, but eliminating the hydrochloric acid, a hydrogenation product was obtained which was chromatographed in the same manner as described in Example 16. Fractions 3 through 6 contained 2.18 g. of 2-fluoro-17β-hydroxy-5β-androstan-3-one melting at 145–146° C. and having the analysis below.

Calculated for $C_{19}H_{29}FO_2$: C, 73.99; H, 9.48; F, 6.61. Found: C, 74.54; H, 9.49; F, 6.5.

EXAMPLE 18

2-fluoro-17β-hydroxy-17α-methyl-5α- and 5β-androstan-3-one

Following the procedure of Examples 16 and 17, but substituting 2-fluoro-17β-hydroxy-17α-methyl-4-androsten-3-one as the starting steroid, there is thus produced 2-fluoro-17β-hydroxy-17α-methyl-5α- and 5β-androstan-3-one.

EXAMPLE 19

2-fluoro-11β,17β-dihydroxy-17α-methyl-5α- and 5β-androstan-3-one

Following the procedure of Examples 16 and 17, but substituting 2-fluoro-11β,17β-dihydroxy-17α-methyl-4-androsten-3-one as the starting steroid, there is thus produced 2-fluoro-11β,17β-dihydroxy-17α-methyl-5α- and 5β-androstan-3-one.

EXAMPLE 20

2-fluoro-17β-hydroxy-17α-methyl-5α- and 5β-androstan-3,11-dione

Following the procedure of Examples 16 and 17, but substituting 2-fluoro-17β-hydroxy-17α-methyl-4-androsten-3,11-dione as the starting steroid, there is thus produced 2-fluoro-17β-hydroxy-17α-methyl-5α- and 5β-androstan-3,11-dione.

EXAMPLE 21

2,9α-difluoro-11β,17β-dihydroxy-17α-methyl-5α- and 5β-androstan-3-one

Following the procedure of Examples 16 and 17, but substituting 2,9α-difluoro-11β,17β-dihydroxy-17α-methyl-4-androsten-3-one as the starting steroid, there is thus produced 2,9α-difluoro-11β,17β-dihydroxy-17α-methyl-5α- and 5β-androstan-3-one.

EXAMPLE 22

2,9α-difluoro-17β-hydroxy-17α-methyl-5α- and 5β-androstane-3,11-dione

Following the procedure of Examples 16 and 17, but substituting 2,9α-difluoro-17β-hydroxy-17α-methyl-4-androstene-3,11-dione as the starting steroid, there is thus produced 2,9α-difluoro-17β-hydroxy-17α-methyl-5α- and 5β-androstane-3,11-dione. These compounds are also prepared by the chromic acid oxidation of 2,9α-difluoro-11β,17β-dihydroxy-17α-methyl-5α- and 5β-androstan-3-one, respectively, according to the method described in Example 6.

Similarly, 2-fluoro-4-androsten-3,17-dione, 2-fluoro-4-androsten-3,11,17-trione, 2-fluoro-11α,17β-dihydroxy-4-androsten-3-one, 2-fluoro-11β,17β-dihydroxy-4-androsten-3-one, 2-fluoro-17β-hydroxy-4-androstene-3,11-dione, 2-fluoro-17β-hydroxy-17α-methyl-4,9(11)-androstadien-3-one, 2-fluoro-9α-chloro-11β,17β-dihydroxy-4-androsten-3-one, 2-fluoro-9α-chloro-11β,17β-dihydroxy-17α-methyl-4-androsten-3-one, 2,9α-difluoro-11β,17β-dihydroxy-4-androsten-3-one, and 2,9α-difluoro-17β-hydroxy-4-androstene-3,11-dione are hydrogenated to 2-fluoro-5α- and 5β-androstane-3,17-dione, 2-fluoro-5α- and 5β-androstane-3,11,17-trione, 2-fluoro-11α,17β-dihydroxy-5α- and 5β-androstan-3-one, 2-fluoro-11β,17β-dihydroxy-5α- and 5β-androstan-3-one, 2-fluoro-17β-hydroxy-5α- and 5β-androstane-3,11-dione, 2-fluoro-17β-hydroxy-5α- and 5β-9(11)-androstene-3,11-dione, 2-fluoro-9α-chloro-11β,17β-dihydoxy-5α- and 5β- androstan-3-one, 2-fluoro-9α-chloro-11β,17β-dihydroxy-17α-methyl-5α- and 5β-androstan-3-one, 2,9α-difluoro-11β,17β-dihydroxy-5α- and 5β-androstan-3-one, and 2,9α-difluoro-17β-hydroxy-5α- and 5β-androstane-3,11-dione, respectively.

We claim:

1. 2α-fluoro - 11β,17β-dihydroxy - 17α-methyl-4-androsten-3-one.

2. 2α-fluoro - 17β-hydroxy-17α-methyl - 4-androstene-3,11-dione.

3. 2α,9α-difluoro - 11β,17β-dihydroxy - 17α-methyl-4-androsten-3-one.

4. 2α,9α-difluoro - 17β-hydroxy - 17α-methyl - 4-androstene-3,11-dione.

5. 2α,9α-difluoro - 11β,17β-dihydroxy - 4-androsten-3-one.

6. 2α-fluoro - 17β-hydroxy - 17α-methyl - 5α-androstan-3-one.

7. 2α-fluoro-17β-hydroxy - 17α-methyl - 5β-androstan-3-one.

8. A compound of the formula

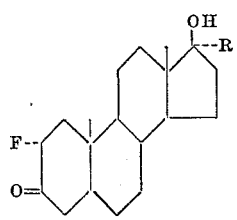

wherein R is a member of the group consisting of hydrogen and methyl.

9. A compound of the formula

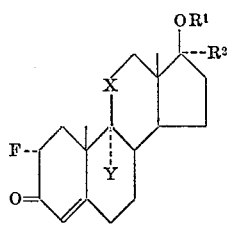

wherein $R^1$ is selected from the group consisting of H and lower alkanoyl; $R_2$ is selected from the group consisting of hydrogen and methyl; X is selected from the group consisting of methylene, hydroxy methylene and carbonyl; Y is selected from the group consisting of hydrogen and, when X is an oxygen containing function, fluorine.

References Cited

UNITED STATES PATENTS

| | | | |
|---|---|---|---|
| 2,678,932 | 5/1954 | Buck et al. | 260—397.3 |
| 2,705,237 | 3/1955 | Berassi et al. | 260—397.3 |
| 2,851,455 | 9/1958 | Fried et al. | 260—239.55 |
| 2,857,403 | 10/1958 | Fried et al. | 260—397.3 |

FOREIGN PATENTS 738,311   10/1955   Great Britain.

OTHER REFERENCES

Ellis et al.: "Journal Chemical Society" (1956) pp. 1179–83 relied on.

ELBERT L. ROBERTS, *Primary Examiner.*